United States Patent Office 3,833,518
Patented Sept. 3, 1974

3,833,518
DENTURE ADHESIVE PREPARATION
Howard Rubin, Rockaway, and James J. Keegan, Bloomfield, N.J., and Ram N. Gidwani, Edmonton, Alberta, Canada, assignors to Warner-Lambert Company, Morris Plains, N.J.
No Drawing. Filed Apr. 13, 1972, Ser. No. 243,816
Int. Cl. C08b 21/08; C08f 37/16
U.S. Cl. 260—17 R                          11 Claims

ABSTRACT OF THE DISCLOSURE

An improved anhydrous denture adhesive is prepared to contain a mixture of a cationic polymeric material and a natural or synthetic anionic gum material as the adhesive ingredient. The mixture may be formulated as a powder or anhydrous paste, which, when applied to dentures and exposed to moisture, develops superior adhesive properties. Suitable cationic materials include at least one of the following: copolymer of substituted or unsubstituted acrylamide with vinyl quaternary ammonium salts; copolymers of substituted, or unsubstituted acrylamide with vinyl and alkyl substituted vinyl pyridinium salts; and an O-lower alkyl-trimethylammonium chloride-substituted-anhydroglucose polymer. As the anionic component there may be used at least one natural gum, such as gum karaya, gum arabic, gum Shiraz, gum tragacanth, pectin, pectinates, algin, and alginates; or at least one synthetic gum including copolymers of maleic anhydride with vinyl-lower alkyl-ethers, carboxymethyl celluloses, and cellulose sulfates.

BACKGROUND OF THE INVENTION

Traditionally, adherent powders used to secure dentures within the mouth were prepared from such materials as finely powdered natural gums, i.e., karaya, acacia or tragacanth gum. These materials have the particular property of swelling to many times their original volume upon the addition of water to form a gelatinous or mucilaginous mass. Denture adhesive powders may be a combination of one or more natural gums, generally flavored with pleasant tasting volatile oils. Many other additives may also be included, such as antiseptics, stabilizers, bactericides, special deodorants, plasticizing agents, fillers, coloring agents, and the like.

Cream forms of the denture adherent, prepared from finely ground particles of the natural gums dispersed in a cream base, are also available and may be used instead of the powder compositions. In any event, when wet with water, the natural gum in either the cream or powder formulation, expands to become a viscous gel which acts as a cushion and an adherent between the denture plate and the gum tissue.

While these relatively simple formulations are effective in securing dentures within the oral cavity for a short period of time, generally more than one application of the adhesive per day is necessary. This is, at best, inconvenient and, therefore, most undesirable.

In recent years, there have been numerous improvements in the above described simple denture adhesive formulations. For example, in U.S. Pat. No. 3,003,988, a water insoluble, water-sensitized copolymer is disclosed as the adhesive or stablizing component of a denture composition. Actually, this patent discloses mixed, partial salts of copolymers of maleic anhydride with lower alkyl-vinyl-ethers, and partial esters of these salts, as the adhesive material. For example, the calcium-sodium partial salts of a partial isopropyl ester of methyl vinyl ester/maleic anhydride copolymer is said to provide a superior denture adhesive.

In U.S. Pat. No. 2,997,399, the principal ingredient of the denture adhesive is a hydroxyethyl cellulose having a certain degree of substitution of ethylene oxide groups per anhydro-glucose unit of the cellulose molecule; preferably, there is also present a lower alkyl ether of cellulose, such as methylether of cellulose, exhibiting temperature-dependent viscosity properties, i.e., showing an increase in viscosity with an increase in temperature. As an optional ingredient in the denture adhesive of U.S. Pat. No. 2,997,399, there may be used a polyacrylamide. This optional ingredient is said to produce an improved "feel," "texture," or "body" in the denture adhesive.

U.S. Pat. No. 3,440,065 discloses still another denture adhesive wherein a powdered, insoluble absorption cellulose material, such as alpha cellulose, wood flour or microcrystalline cellulose, is incorporated into a gum-petrolatum base adhesive. As the gum in the adhesive, sodium carboxymethyl cellulose, hydroxyethyl cellulose, karaya gum, guar gum, tragacanth and mixtures thereof are suggested.

Another improvement over conventional denture adhesives is claimed in U.S. Pat. No. 3,511,791, which teaches that copolymers or acrylamide and acrylic acid, or homopolymers of acrylamide can form the principal adhesive component in a denture adherent to provide sustained adherence in use without swelling. Whenever a homopolymer of acrylamide, which is nonionic in character, is used, gum karaya is added to the formulation in order to provide a synergistic improvement in gel strength and adhesiveness.

Further, U.S. Pat. No. 3,575,915 discloses a superior denture adhesive containing polyvinyl acetate, water, ethanol, a mineral hydrocolloid, such as colloidal silicate, and a plasticizer.

U.S. Pat. No. 2,978,812 discloses the addition of ethylene oxide homopolymers to denture adhesive gums, including cellulose derivatives, to improve adhesive qualities.

While all of the above denture adhesives provide some improvement over simple formulations containing only finely powdered natural gums, it is generally recognized that no one product has yet been developed which can accommodate, over a long period of time, the many variations in temperature, pH and mechanical agitation which are quite normal in the oral cavity.

It has now been found that the denture adhesive of this invention will provide superior adherent properties over prolonged periods of time and under unusually varied conditions, without the disadvantages characteristic of previously known products.

SUMMARY OF THE INVENTION

An anhydrous denture adhesive comprises a mixture of a cationic polymeric component and an anionic natural or synthetic gum component which, when applied to dentures and exposed to moisture, develops adhesive properties. Suitable cationic materials include at least one of the following: copolymers of substituted or unsubstituted acrylamide with vinyl quaternary ammonium salts; copolymers of substituted or unsubstituted acrylamide with vinyl and alkyl-substituted vinyl pyridinium salts; and an O-lower alkyl-trimethylammonium chloride-substituted-anhydroglucose polymer. As the anionic component there may be used at least one natural gum, such as gum karaya, gum arabic, gum Shiraz, gum tragacanth, pectin, pectinates, algin and alginates; or at least one synthetic gum including copolymers of maleic anhydride with vinyl-lower alkyl-ethers; carboxymethyl celluloses; and cellulose sulfates. In the preferred products of the invention, the cationic component is a copolymer of acrylamide with a vinyl quaternary ammonium salt and the anionic component is a carboxymethyl cellulose gum.

DESCRIPTION OF THE INVENTION

This invention relates to an anhydrous denture adhesive, which, when in contact with moistened denture plates and the saliva, hydrates within the oral cavity to provide superior adherent properties. The principal adhesive force develops when the mixture of the anhydrous cationic polymeric component and the anhydrous anionic gum material is exposed to moisture. The term cationic polymeric component is meant to include one or more of the following polymeric components:

(1) Copolymers of an acrylamide having the formula:

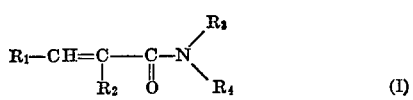

(I)

wherein $R_1$ is methyl or hydrogen; and $R_2$, $R_3$, and $R_4$ are each hydrogen or alkyl, with vinyl quaternary ammonium salts including trialkylaminoalkyl acrylate salts, trialkylaminoalkyl methacrylate salts, and vinyloxyalkyltrialkylammonium salts; wherein the alkyl groups are 1 to 7 carbon lower alkyl, preferably 1 to 3 carbon lower alkyl;

(2) Copolymers of an acrylamide having the formula (I) above with vinyl and alkyl-substituted vinyl pyridinium salts including 2-vinyl pyridinium salts, 4-vinyl pyridinium salts, 2-alkyl-5-vinyl pyridinium salts, and 2-vinyl-5-alkyl pyridinium salts, wherein the alkyl groups are 1 to 7 carbon lower alkyl, preferably 1 to 3 carbon lower alkyl; and (3) An O-lower alkyl-trimethylammoniumchloride-substituted-anhydroglucose polymer wherein there are 1 to 7, preferably 1 to 3 carbon atoms in the alkyl group.

As the quaternary-forming salts in (1) and (2) above there may be mentioned such non-toxic, quaternary forming salts as alkyliodide, alkylchloride, alkylbromide, and alkyl sulfate salts wherein the alkyl group is a lower alkyl group containing 1 to 7 carbon atoms, preferably 1 to 3 carbon atoms. Methyl sulfate salts are particularly preferred. Copolymers of substituted and unsubstituted acrylamide in (1) and (2) above are described in U.S. Pats. Nos. 3,336,269, 3,336,270, and 3,509,113. They are prepared, as described in these last mentioned patents, by a solution polymerization process, wherein an acrylamide monomer having the formula I above and, optionally, an ethylenically unsaturated comonomer, are dissolved in a special solvent (either an acetone-water mixture or an acetone-tertiary-butanol-water mixture) and polymerized to yield a polymeric product in the form of relatively unswollen, hard, non-tacky granules which can be readily isolated from the polymerization reaction by simple filteration, since the polymeric products are not soluble in the polymerization solvent. The polymerization is carried out in the substantial absence of air and the use of a polymerization initiator is recommended. The polymerization temperature is dependent upon the particular initiator used in the system. The concentrations of solvent and the monomer in the polymerization mixture is critical: for the monomers, 5%–50% (preferably 20%–35%) by weight, based on the weight of the polymerization reaction mixture is recommended; for the acetone-water mixture solvent, 30%–70% (preferably 35%–50%) is used; and for the acetone-tertiary butanol-water mixture solvent, 5%–65% (preferably 30%–50%) is recommended, with the amount of tertiary butanol in this last solvent being 5%–65% (preferably 30%–50%) by weight, based on the weight of the solvent mixture.

As is usual for polymerization reactions, the molecular weight of the polymers obtained varies directly with the monomer concentration used in the intial reaction mixture. Monomer concentration should be from 15%–50%, preferably 20%–35% by weight of the total polymerization reaction mixture if high molecular weight polymers are desired. Monomer concentrations above 50% yield polymeric products having undesirably large, sticky gel particles. For low molecular weight polymers, monomer concentrations below 10% must be used. However, concentrations below 4%–5% are impractical, since a suspension instead of the desired precipitate of the polymer is obtained.

By selecting suitable concentrations of ingredients and polymerization conditions as described in U.S. Pats. Nos. 3,336,269, 3,336,270, and 3,509,113, it has been found to be possible to obtain cationic polymers and copolymers in the form of finely divided powders having molecular weights of from 5 million to 10 million, which are suitable for use as a cationic ingredient in the denture adhesive of this invention. These polymers and copolymers are soluble in warm or cold water and produce clear solutions having viscosities of from 700 to 1800 centipoises, as measured in a 1% aqueous solution of the polymer, at 25° C. with a standard Brookfield LVF Viscometer.

The third cationic polymeric ingredient described in (3) above as an O-lower alkyl-tri-methylammonium chloride-substituted-anhydroglucose polymer, wherein the alkyl group is a 1 to 7 carbon lower alkyl, preferably 1 to 3 carbon lower alkyl, is more fully described in U.S. Pat. No. 3,472,840, patented Oct. 14, 1969. Polymers of this type are characteristically cationic; and a particularly preferred cationic polymer in this class is water soluble and, at a concentration of 1% and a temperature of 25° C., yields a solution having a viscosity of 400 centipoises.

Among the above-described types of cationic polymeric materials, the following have been found to be particularly suitable for use in the denture adhesive of this invention:

(1) Copolymers of acrylamide with vinyl quaternary ammonium salts including trialkylaminoalkyl acrylate salts, trialkylaminoalkyl methacrylate salts, and vinyloxyalkyltrialkylammonium salts, wherein the alkyl groups are 1 to 7 carbon lower alkyl, preferably 1 to 3 carbon lower alkyl; and (2) Copolymers of acrylamide with vinyl and alkyl-substituted vinyl pyridinium salts including 2-vinyl pyridinium salts, 4-vinyl pyridinium salts, 2-alkyl-5- vinyl pyridinium salts, and 2-vinyl-5-alkyl pyridinium salts, wherein the alkyl groups are 1 to 7 carbon lower alkyl, preferably 1 to 3 carbon lower alkyl.

As typical trialkyl aminoalkyl acrylate salt monomer there may be mentioned acryloyloxymethyltrimethyl ammonium methylsulfate; β-acryloyloxyethyltrimethyl ammonium methylsulfate; γ-acryloyloxypropyltrimethyl ammonium methyl sulfate; and acryloyloxymethyltriethyl ammonium ethylsulfate.

As typical trialkylaminoalkyl methacrylate salt monomers there may be mentioned methacryloyloxymethyltrimethyl ammonium methyl sulfate; β-methacryloyloxyethyltrimethyl ammonium methyl sulfate; β-methacryloyloxyethyltriethyl ammonium ethyl sulfate; and γ-methacryloyloxypropyltrimethyl ammonium methyl sulfate.

As typical vinyloxyalkyltrialkylammonium salt monomers there may be mentioned vinyloxyethyltrimethyl ammonium methyl sulfate; vinyloxypropyltrimethyl ammonium methyl sulfate; and vinyloxymethyltrimethyl ammonium methyl sulfate.

As typical vinyl pyridinium salts there may be mentioned 1-methyl-2-vinyl pyridinium methyl sulfate; 1-ethyl-4-vinyl pyridinium ethyl sulfate; 1,2-dimethyl-5-vinyl pyridinium methyl sulfate; 1-methyl-2-vinyl-5-ethyl pyridinium methyl sulfate; and 1-methyl-2-vinyl-5-propyl pyridinium methyl sulfate.

The amount of each monomeric component in the above-mentioned cationic copolymers utilized in the denture adhesive of the invention may be varied within certain ranges to provide a product suitable for use in the denture adhesive of this invention. Generally, from 50% to 90% by weight of the acrylamide-type monomer, preferably 63% to 85%, most preferably 85% by weight, based on the total weight of the copolymer, is used. Correspondingly, from 10% to 50% by weight of the vinyl quaternary ammonium salt (or the vinyl pyridinium salt) comonomer, preferably 15% to 37%, most preferably 15% by weight, based on the total weight of the copolymer, is used.

The preferred cationic component for the denture adhesive of this invention is a copolymer of acrylamide with one of the above-mentioned vinyl quaternary ammonium salts.

In a most preferred embodiment of this invention, the cationic component comprises 85% by weight of acrylamide and 15% by weight of a trialkylaminoalkyl methacrylate salt having 1 to 3 carbon atoms in the alkyl group, i.e., β-methacryloyloxyethyltrimethyl ammonium methyl sulfate, based on the total weight of the copolymer.

As the anionic ingredient of the denture adhesive of this invention, there may be used one or more gums of the natural variety selected from the group gum karaya, gum arabic, gum Shiraz, gum tragacanth, pectin, pectinates, algin, alginates, and the like, which are anionic in character; or one or more synthetic gums, that is, one or more of the carboxymethylcellulose gums, the cellulose sulfate gums or a synthetic gum which is a copolymer of maleic anhydride with vinyl-lower alkyl-ethers having from 1 to 5 in the lower alkyl group.

Maleic anhydride/vinyl-alkyl-ether copolymers are described in U.S. Pat. No. 2,047,398, patented July 14, 1936 and in U.S. Pat. No. 2,782,182, patented on Feb. 19, 1957. The alkyl group in the vinyl ether may contain from 1 to 5 carbon atoms. Suitable lower alkyl vinyl ether monomers include methyl vinyl ether, ethyl vinyl ether, divinyl ether, propyl vinyl ether, isobutyl ether and the like. Polymerization techniques used to obtain these copolymers are those well known in the art, i.e. utilizing appropriate proportions of monomers and reaction conditions. The mole ratio of the total of ether monomers to the total of maleic anhydride is substantial unity; polymerization of one mole of alkyl vinyl ether with one mole of maleic anhydride. It is desirable that the copolymer be in the free acid form: monovalent, alkali metal salts thereof may also be used. Copolymers of this type have been found to be gum-like and have anionic characteristics and may therefore be used as the anionic component in the denture adhesive of this invention.

Among the suitable anionic materials described above, one or more of the following gums have been found to be especially effective in the denture adhesive of this invention: gum karaya, gum arabic, gum Shiraz, and carboxymethylcellulose gum. The carboxymethylcellulose gums are particularly preferred, especially the sodium carboxymethylcellulose gums.

The sodium carboxymethylcellulose gums are water soluble, anionic, long chain polymers, derived from cellulose. Properties vary with the average number of carboxy methyl groups that are substituted per anhydroglucose unit in each cellulose molecule. This property is generally referred to as "the degree of substitution," with the maximum substitution possible designated as "3.0" since there are just three hydroxy groups capable of reaction in each anhydroglucose unit. For the practice of this invention, it has been found that one or more cellulose gums having a degree of substitution of from .4 to 1.2 is suitable. The viscosity of 1% solution of the gum, measured at 25° C., should be in the range of from about 100 to 20,000 centipoises.

Sodium carboxymethylcellulose gums of this type are more fully described in "Chemical and Physical Properties: Cellulose Gum," 1968, published by Hercules, Incorporated, Cellulose and Protein Products Department, 910 Market St., Wilmington, Del. 19899.

The particle size of the cellulose gum is also important and should be predominantly of a fine grain, that is, of a size such that at least 80% of the particles pass through a 200 mesh screen, while only 0.5% of the particles are retained on a 60 mesh screen. A lesser amount of the cellulose gum may be of regular grade, having particles of a size such that no more than 5% are retained on a 40 mesh screen, while only 1% are retained on a 30 mesh screen. A particularly advantageous gum component for use in the denture adhesive of this invention has been found to be sodium carboxymethylcellulose gums, of different particle size, but within the above-stated range. This combination of gums may also be of a different degree of substitution, but, again, within the above stated range.

The denture adhesive of this invention may be formulated to contain the cationic polymer and the anionic gum in either powder or paste form. In the powder formulation, the two anhydrous, particulate, components are admixed with the usual flavors and colorants in the following proportions: for the cationic polymer, from 1% to 80%, preferably from 3% to 50% by weight, based on the weight of the total formulation is suitable; for the anion source, from 20% to 99%, preferably from 30% to 90%, by weight, based on the weight of the total formulation may be used. Other ingredients such as non-toxic anti-caking agents (silica, magnesium stearate, talcum powder or the like may also be included). The mixture of ingredients is thoroughly agitated or stirred to yield a generally homogenous intermixing of all components.

In the paste formulations, the cationic polymer and the anionic gum are admixed with petrolatum, mineral, animal or vegetable oils, and the like, along with flavors, colorants and certain commonly used preservatives and fillers.

A particularly preferred paste or cream formulation is prepared by utilizing as the cream or paste base, the product of U.S. Pat. No. 3,215,599. The cream or paste base of this patent is characterized as a mixture of white petroleum oil with a minor amount of a polyethylene wax having an average molecular weight of 1000 to 20,000. This product is described as having emollient properties, useful in the formulation of medicaments where absorption of the medicament by the skin is of paramount importance. Denture adhesive creams formulated with this petroleum oil/polyethylene wax blend as the paste or cream base display unusually good stability, extrudability and product appearance. The successful use of a "cosmetic" or "medicinal" vehicle in the denture adhesive of the invention, to provide a cream formulation of improved properties is most unexpected.

Concentrations of ingredients in a cream or paste denture adhesive are as follows: for the cationic polymer, from 1% to 40%, preferably 5% to 25% by weight based on the weight of the total formulation; for the anion source, from 15% to 50%, preferably 25% to 40% by weight based on the weight of the total formulation; and for the cream base, from 30% to 65%, preferably 40% to 60% by weight, based on the weight of the total formulation. In the aforementioned particularly preferred cream formulation utilizing the petroleum oil with polyethylene wax blend of U.S. Pat. No. 3,215,599, the petroleum oil and the polyethylene wax are used in amounts of from 3% to 20%, preferably 5% to 15% of polyethylene wax and 80% to 97%, preferably 85% to 95% by weight of petroleum oil, based on the total weight of the cream or paste base in the denture adhesive formulation.

Whether formulated as a powder or paste, the denture adhesive mixture of this invention, when applied to dentures and exposed to moisture, hydrates to form an adhesive combination markedly superior to prior art, preformed adhesive materials.

In order to further illustrate this invention, the following examples are given:

EXAMPLE 1

Preparation of Denture Adhesive Cream

A. Weigh 44.2375 pounds of heavy mineral oil into a steam-jacketed Hobart mixer and heat to 90° C. At 90° C., add 6.5 pounds of a polyethylene wax of average molecular weight 2000, and disperse the wax thoroughly in the mineral oil while force cooling the batch to 70° C. during mixing. At 70° C., add 0.05 pounds of methyl paraben and 0.10 pounds of propyl paraben, and mix well, while force cooling the batch to 45° C.

B. In a Hobart mixer, add 10 pounds of a copolymer of 85% by weight acrylamide with 15% by weight β-methacryloyloxyethyltrimethyl ammonium methyl sulfate; 4 pounds of a sodium carboxymethylcellulose gum with a degree of substitution of .4 and a viscosity of 400 to 1000 centipoises; 35 pounds of a sodium carboxymethylcellulose gum with a degree of substitution of .7 and a viscosity of 1300 to 2200 centipoises; and 0.125 pounds of FD and C Red No. 3 Lakolene (19% pure dye); mix these dry ingredients until complete blending is achieved. At 45° C., add B to A and mix for about 15 minutes with the Hobart blades.

C. Add 0.10 pounds of peppermint oil, U.S.P. to the mixture of A and B and mix at a high speed until a homogeneous cream is obtained.

EXAMPLE 2

Preparation of Denture Adhesive Cream

A denture adhesive cream is prepared from the following ingredients:

| | Pounds |
|---|---|
| Copolymer of acrylamide and acryloyloxyethyltrimethyl ammonium methyl sulfate | 120.0 |
| Sodium carboxymethyl cellulose gum (degree of substitution 0.7) | 230.0 |
| Petrolatum | 329.9 |
| Mineral oil | 318.0 |
| Propyl paraben | 1.00 |
| Peppermint oil | 1.00 |
| F.D. & C. Red #3 Aluminum Lake | 0.10 |

The mineral oil and petrolatum are added to a steam-jacketed Hobart mixer and heated to 70° C. At 70° C., the propyl paraben is added, mixed well and the mixture is force-cooled to 45° C. The procedure of Example 1, parts B and C, is followed for all of the remaining ingredients.

EXAMPLE 3

Preparation of a Denture Adhesive Cream

A. Into a steam-jacketed Hobart mixer, add 45.0075 pounds of heavy mineral oil, and heat to 90° C. At 90° C., add 7 pounds of a polyethylene wax of average molecular weight 1000, and disperse the two ingredients thoroughly, while force cooling to 70° C. during mixing. At 70° C., add 0.05 pounds of methyl paraben and 0.10 pounds of propyl paraben and mix well, while force cooling the batch to 45° C.

B. In a Hobart mixer, add 37.73 pounds of gum arabic (100 mesh, sterilized); 10 pounds of the cationic copolymer of acrylamide with β-methacryloyloxyethyltrimethyl ammonium methyl sulfate; and 0.0125 pounds of F.D. & C. Red No. 3 Lakolene (19% pure dye) and mix these dry ingredients until complete blending is achieved. Add B to A, at 45° C. and mix for 15 minutes with the Hobart blades.

C. Add 0.10 pounds of peppermint oil, U.S.P. to the mixture of A and B, and mix at high speeds until a homogeneous cream is obtained. Continue mixing until the batch reaches a temperature of 25° C.

EXAMPLE 4

Preparation of Denture Adhesive Cream

A denture adhesive cream is prepared from the following ingredients:

| | Pounds |
|---|---|
| Copolymer of acrylamide and 12-dimethyl-5-vinyl pyridinium methyl sulfate | 150 |
| Gum karaya | 400 |
| Petrolatum | 445 |
| Methyl paraben | 0.5 |
| Propyl paraben | 1.0 |
| Peppermint oil | 2.0 |
| F.D. & C. Red #3 Aluminum Lake | 1.5 |

The petrolatum is added to a steam-jacketed Hobart mixer and heated to 70° C. At 70° C., the methyl paraben and propyl paraben are added, mixed well, and the mixture is force-cooled to 45° C. The procedure of Example 1, parts B and C, is followed for all of the remaining ingredients.

EXAMPLE 5

Preparation of Denture Adhesive Cream

A denture adhesive cream is prepared from the following ingredients:

| | Pounds |
|---|---|
| Copolymer of acrylamide and acryloyloxymethyltriethylammonium ethyl sulfate | 50 |
| Gum arabic | 450 |
| Petrolatum | 496.5 |
| Propyl paraben | 1.5 |
| Peppermint oil | 1.0 |
| F.D. & C. Red #3 Aluminum Lake | 1.0 |

The petrolatum is added to a steam-jacketed Hobart mixer and heated to 70° C. At 70° C., the propyl paraben is added, mixed well, and the mixture is force-cooled to 45° C. The procedure of Example 1, parts B and C, is followed for all of the remaining ingredients.

EXAMPLE 6

Preparation of Denture Adhesive Cream

A denture adhesive cream is prepared from the following ingredients:

| | Pounds |
|---|---|
| Polyvinyl alcohol | 125.0 |
| Copolymer of acrylamide and methacryloyloxymethyltrimethyl ammonium methyl sulfate | 62.5 |
| Copolymer of methyl vinyl ether and maleic acid | 62.5 |
| Petrolatum | 149.0 |
| Mineral oil | 100 |
| Propyl paraben | 0.50 |
| Methyl paraben | 0.50 |
| F.D. & C. Red #3 Aluminum Lake | 0.50 |
| Imitation peppermint oil | 0.50 |

The petrolatum and mineral oil are added to a steam-jacketed mixture and heated to 70° C. At 70° C., the methyl paraben and propyl paraben are added and the mixture is force-cooled to 45° C. The procedure of Example 1, parts B and C, is followed for all of the remaining ingredients.

EXAMPLE 7

Preparation of Denture Adhesive Powder

A denture adhesive powder is prepared to contain the following ingredients:

| | Pounds |
|---|---|
| Copolymer of acrylamide and γ-methacryloyloxypropyltrimethylammonium methyl sulfate | 150 |
| Sodium cellulose sulfate | 848 |
| Micronized silica | 1 |
| Peppermint oil | 1 |

The peppermint oil is well dispersed in about 25 pounds of the sodium cellulose sulfate.

The micronized silica is similarly dispersed in about 25 pounds of the cellulose sulfate salt.

The two premixes are then added to the balance of the sodium cellulose sulfate which has previously been placed in a ribbon blender mixing apparatus. The whole is then mixed for about 15 minutes, after which the 150 pounds of the copolymer is added and the batch mixed for an additional 15 minutes.

EXAMPLE 8

Preparation of Denture Adhesive Powder

A denture adhesive powder is prepared, according to the procedure of Example 7, from the following ingredients:

| | Pounds |
|---|---|
| O-Ethyltrimethylammonium chloride-substituted anhydroglucose polymer | 100 |
| Gum acacia | 891 |
| Anise oil | 1 |

EXAMPLE 9

Preparation of Denture Adhesive Powder

A denture adhesive powder is prepared according to the procedure of Example 7, from the following ingredients:

| | Pounds |
|---|---|
| Copolymer of acrylamide and β-methylacryloyloxymethyltrimethyl ammonium methyl sulfate | 9.0 |
| Gum tragacanth | 44.5 |
| Gum Shiraz | 46.4 |
| Spearmint oil | 0.05 |
| Peppermint oil | 0.05 |

EXAMPLE 10

Preparation of Denture Adhesive Powder

A denture adhesive powder is prepared, according to the procedure of Example 7, from the following ingredients:

| | Pounds |
|---|---|
| Copolymer of acrylamide and β-methylacryloyxyethyltrimethyl ammonium methyl sulfate | 300 |
| Sodium carboxymethylcellulose gum (degree of substitution 0.7) | 699 |
| Peppermint oil | 1 |

What is claimed is:

1. A denture adhesive comprising a substantially anhydrous mixture of:
   (A) from about 1.0% to about 80% by weight, based on the total weight of the denture adhesive, of at least one cationic polymeric material selected from the group consisting of:
      (1) a copolymer of an acrylamide having the formula:

$$R_1-CH=C-C-N\diagup^{R_3}_{R_4}\qquad (I)$$
$$\phantom{R_1-CH=}|\phantom{C-}\|$$
$$\phantom{R_1-CH=}R_2\phantom{C}O$$

wherein $R_1$ is methyl or hydrogen; and $R_2$, $R_3$, and $R_4$ are each hydrogen or 1 to 7 carbon lower alkyl, with a vinyl quaternary ammonium salt selected from the group consisting of trialkylaminoalkyl acrylate salts, trialkylaminoalkyl methacrylate salts, and vinyloxyalkyltrialkylammonium salts, wherein the alkyl group contains from 1 to 7 carbon atoms; and
      (2) a copolymer of an acrylamide having the formula (I) above with a vinyl or alkyl-substituted vinyl pyridinium salt, wherein the alkyl group is 1 to 7 carbon lower alkyl; and
   (B) from about 20% to about 99% by weight, based on the total weight of the denture adhesive, of at least one anionic gum selected from the group consisting of carboxymethylcellulose gum and cellulose sulfate gum.

2. A denture adhesive according to Claim 1 wherein the cationic polymeric material is a copolymer of acrylamide with a vinyl quaternary ammonium salt selected from the group consisting of trialkylaminoalkyl acrylate salts, trialkylamonoalkyl methacrylate salts, and vinyloxyalkyltrialkylammonium salts wherein the alkyl group contains from 1 to 3 carbon atoms.

3. A denture adhesive according to Claim 2 comprising a substantially anhydrous mixture of from about 3.0% to about 50% by weight of the cationic polymeric material, and from about 30% to about 90% by weight of the anionic gum.

4. A denture adhesive according to Claim 3 wherein the anionic gum is a carboxymethylcellulose gum.

5. A denture adhesive according to Claim 3 wherein the cationic polymeric material is a copolymer of acrylamide with a trialkylaminoalkyl methacrylate salt having from 1 to 3 carbon atoms in the alkyl group.

6. A denture adhesive according to Claim 4 wherein the anionic gum is at least one sodium carboxymethylcellulose gum.

7. A denture adhesive according to Claim 1 which additionally contains from about 10% to about 75% by weight, based on the weight of the total denture adhesive compositions of non-toxic, powdered, excipient materials.

8. A denture adhesive according to Claim 1 which additionally contains from about 30% to about 75% by weight, based on the weight of the total denture adhesive composition of at least one cream base material selected from the group consisting of petrolatum, natural and synthetic oils.

9. A denture adhesive according to Claim 1 which additionally contains from about 30% to about 75% by weight, based on the weight of the total denture adhesive composition, of a cream base material which is a combination of mineral oil with a minor amount of a polyethylene wax having a molecular weight of 1000 to 20,000.

10. A denture adhesive composition comprising:
    (A) about 30% by weight, based on the weight of the total adhesive composition of a cationic copolymer of acrylamide with β-methacryloyloxyethyltrimethyl ammonium methyl sulfate;
    (B) about 69.9% by weight of sodium carboxymethylcellulose; and
    (C) about 0.1% by weight of flavors.

11. A denture adhesive composition comprising:
    (A) about 10% by weight, based on the weight of the total adhesive composition, of a cationic copolymer of acrylamide with β-methacryloyloxyethyltrimethyl ammonium methyl sulfate;
    (B) about 4% by weight of sodium carboxymethylcellulose gum, having a degree of substitution of about .4%;
    (C) about 35% by weight of a sodium carboxymethylcellulose gum having a degree of substitution of about .7%
    (D) about 44.2% by weight of heavy mineral oil;
    (E) about 6.5% by weight of a polyethylene wax having a molecular weight of 2000;

(F) about 0.3% by weight of flavors, coloring agents and excipients.

References Cited

UNITED STATES PATENTS

| | | | |
|---|---|---|---|
| 3,003,988 | 10/1961 | Germann et al. | 260—33.6 |
| 3,509,113 | 4/1970 | Monagle et al. | 260—79.3 |
| 3,440,065 | 4/1969 | La Via | 106—35 |
| 3,572,840 | 10/1969 | Stone et al. | 260—231 |
| 3,215,599 | 11/1965 | Thau et al. | 167—63 |
| 3,736,274 | 5/1973 | Schoenholz et al. | 260—17 R |

MELVIN GOLDSTEIN, Primary Examiner

W. C. DANISON, JR., Assistant Examiner

U.S. Cl. X.R.

106—35; 260—Digest 36